(12) United States Patent
Tian et al.

(10) Patent No.: US 9,557,986 B2
(45) Date of Patent: Jan. 31, 2017

(54) SYSTEMS AND METHODS FOR CUSTOMIZING AND PROGRAMMING A CLOUD-BASED MANAGEMENT SERVER

(71) Applicant: VMware, Inc., Palo Alto, CA (US)

(72) Inventors: Feng Tian, Fremont, CA (US); Haoran Zheng, Shanghai (CN); Weijin Wang, Shanghai (CN); Yuanzhi Wang, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 550 days.

(21) Appl. No.: 13/906,332

(22) Filed: May 30, 2013

(65) Prior Publication Data

US 2014/0359610 A1 Dec. 4, 2014

(51) Int. Cl.
| | | |
|---|---|---|
| *G06F 9/44* | (2006.01) | |
| *G06F 9/445* | (2006.01) | |
| *G06F 9/455* | (2006.01) | |
| *G06F 9/50* | (2006.01) | |

(52) U.S. Cl.
CPC . *G06F 8/68* (2013.01); *G06F 8/61* (2013.01); *G06F 8/65* (2013.01); *G06F 9/45558* (2013.01); *G06F 9/5072* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,224,934 B1* | 7/2012 | Dongre | 709/221 |
| 8,881,129 B1* | 11/2014 | McKinnon | G06F 9/44 717/168 |
| 2013/0227560 A1* | 8/2013 | McGrath | G06F 9/45558 718/1 |
| 2014/0019498 A1* | 1/2014 | Cidon | G06F 17/3007 707/827 |

* cited by examiner

*Primary Examiner* — Lewis A Bullock, Jr.
*Assistant Examiner* — Mark Gooray (57) ABSTRACT

Systems and methods for managing Software-as-a-Service (SaaS) provided by a virtual machine are described. The system may include a management application, and may receive a feature package from the virtual machine. The feature package may be associated with a function supported by the virtual machine. The system may integrate the feature package into the management application, and transmit a first command to the virtual machine for executing the function at the virtual machine. The first command may be generated by the management application based on the feature package.

11 Claims, 5 Drawing Sheets

SYSTEMS AND METHODS FOR CUSTOMIZING AND PROGRAMMING A CLOUD-BASED MANAGEMENT SERVER

BACKGROUND

A Software-as-a-Service (SaaS) provider may offer software applications as software services. These software applications may be designed for different operating systems, or programmed using various programming languages, middleware, and other technologies. Each of these software applications may have a distinctive user interface, and may have a specific approach in managing its own operations. For example, different software applications may have different methods in provisioning, backing-up, and upgrading. Thus, a SaaS management server may need to be pre-programmed with interfacing functionalities in order to interact with these software applications. Likewise, an operator of the SaaS provider may have to learn and support the distinctive user interface and management approach of each software application in order to offer these software applications as software services.

SUMMARY

Systems and methods for managing SaaS provided by a virtual machine are described. The system may include a management application, and may receive a feature package from the virtual machine. The feature package may be associated with a function supported by the virtual machine. The system may integrate the feature package into the management application, and transmit a command to the virtual machine for executing the function at the virtual machine. The command may be generated by the management application based on the feature package.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In some embodiments, a cloud management server may be configured to manage a cloud network having one or more virtual machines providing SaaS to cloud-based clients. The cloud management server may utilize a management application for monitoring and controlling the various software applications executing on the one or more virtual machines. When a new virtual machine joins the cloud network, or an existing virtual machine in the cloud network includes new software applications to its software services, the new or existing virtual machine may submit a feature package to the cloud management server. The feature package may contain sufficient information to customize and program the management application, thereby enabling the cloud management server to manage the new virtual machine or the new software applications without making any code changes to the management application. Further, the cloud management server may be able to utilize an existing user interface of the management application for managing new or updated virtual machines and software applications.

Figure 1:
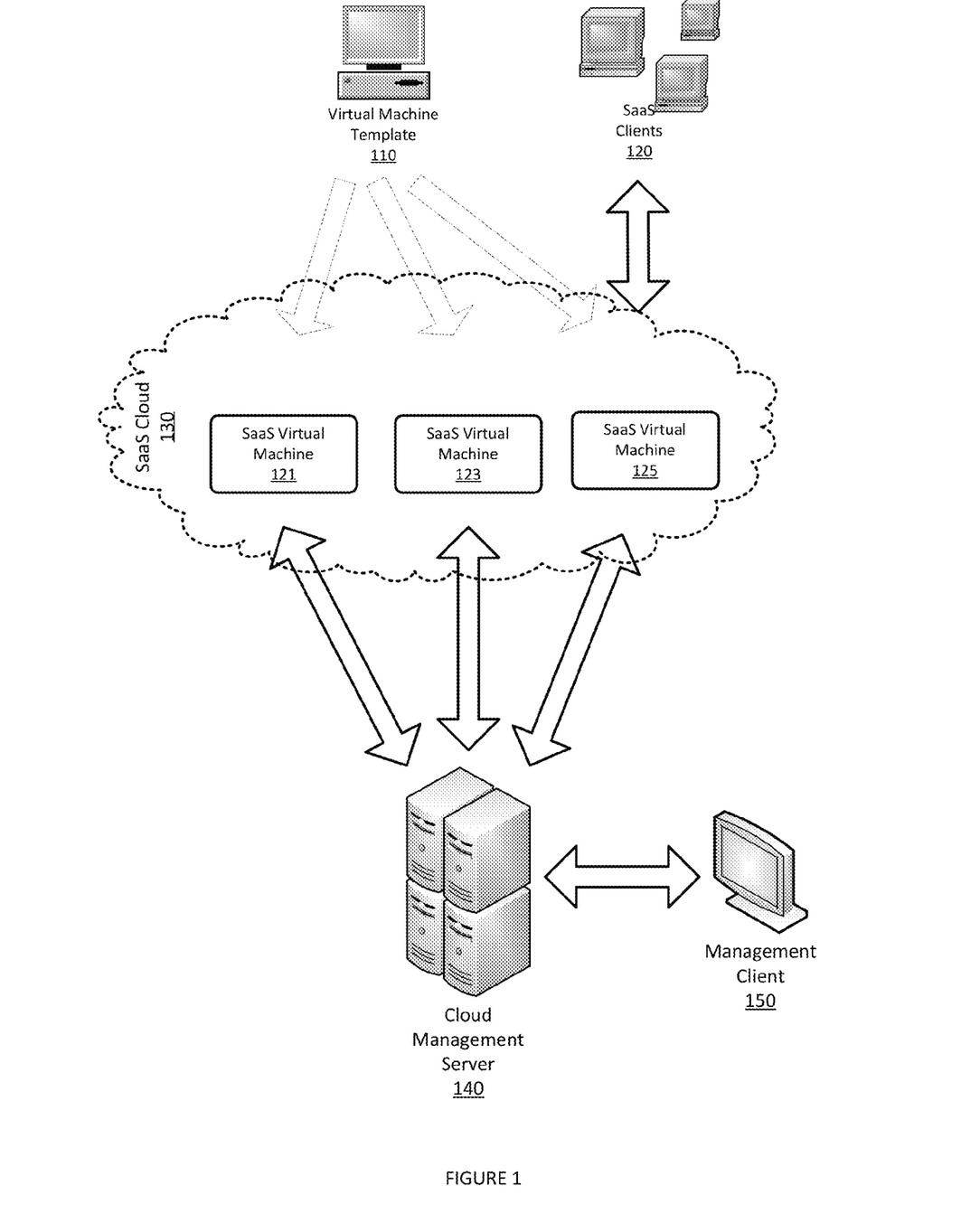
FIG. 1 illustrates a SaaS environment within which a cloud management server may be customized and programmed.

FIG. 1 illustrates a software-as-a-service (SaaS) environment within which a cloud management server may be customized and programmed, according to some embodiments of the present disclosure. In FIG. 1, a SaaS cloud 130, which may be formed by one or more SaaS virtual machines 121, 123, and 125, and may be configured to provide cloud-based software services to one or more SaaS clients 120. The SaaS virtual machines 121, 123, and 125 may be created based on a virtual machine template 110. A cloud management server 140, which may be configured to manage the SaaS cloud 130 and the SaaS virtual machines 121, 123, and 125, may be accessible via a management client 150. The SaaS virtual machines 121, 123, and 125, as well as the cloud management server 140 may be implemented using one or more physical computer systems (not shown in FIG. 1), which may include one or more processors, memory, and other hardware components.

In some embodiments, the SaaS cloud 130 may be configured to provide software applications as software services over a network. The SaaS clients 120 may then access the SaaS cloud 130 and its software services using a web browser or a light-weight application. The provider of the SaaS cloud 130 may be responsible for the management of the infrastructure of the SaaS cloud 130 and the operations of the software services. The SaaS clients 120 may be able to utilize the software services without installing the software applications. The SaaS cloud 130 may be scalable, as its software services may be provided by one or more of the SaaS virtual machines 121, 123, and 125. Further, the SaaS loud 130 may utilize load-balancing to distribute the requests from the SaaS clients 120 to multiple SaaS virtual machines 121, 123, and 125, while the SaaS clients 120 may use a single access point to the SaaS cloud 130 even when some of the SaaS virtual machines are under heavy loads.

In some embodiments, the cloud management server 140 may create the SaaS virtual machines 121, 123, and 125 by cloning based on a virtual machine template 110. The virtual machine template 110 may define a standardized group of hardware and software configurations for hardware components, virtual hard disks, operating systems, and software applications. The virtual machine template 110 may also contain cloud-based SaaS configurations. Once created, the SaaS virtual machines 121, 123, and 125 may appear as physical computer systems to the SaaS clients 120, and may be further customized based on the specific needs of the SaaS clients 120. After creation, the SaaS virtual machines 121, 123, and 125 may provide on-demand software services to the SaaS clients 120.

In some embodiments, the cloud management server 140 may use a commercial or open source "management application" to manage the SaaS cloud 130 as well as the SaaS virtual machines 121, 123, and 125. Based on the instructions received from the management client 150, the management application of the cloud management server 140 may perform specific management tasks such as configuring hardware and software, starting and stopping a specific SaaS virtual machine, and/or backing-up/restoring the software applications in the SaaS virtual machine.

In some embodiments, when the SaaS virtual machines 121, 123, and 125 are homogenous (meaning these SaaS virtual machines may have similar capabilities and configurations), a standard management application may be sufficient to manage all the SaaS virtual machines 121, 123, and 125. The management application may interact with a common agent application executing in each of the SaaS virtual machines 121, 123, and 125. Specifically, the agent applications and the management application may communicate in a pre-defined protocol, with the agent applications acting on behalf of the management application to control and monitor the SaaS virtual machines 121, 123, and 125 and to provide software services for the SaaS cloud 130. Once the management application transmits a pre-defined command to an agent application of a specific SaaS virtual machine, the agent application may perform pre-defined operations on the specific SaaS virtual machine, and report operation results and statistics back to the management application. Often, the management application may have more knowledge about the agent application than the agent application may have about the management application. However, when a new SaaS virtual machine having different hardware or software configurations is added to the SaaS cloud 130, or when an existing SaaS virtual machine in the SaaS cloud 130 is installed with new software applications, the management application may no longer be able to manage the new SaaS virtual machine or the new software applications using its pre-defined commands.

In some embodiments, each of the SaaS virtual machines 121, 123, and 125 may contain an agent application that is capable of customizing and programming the management application in the cloud management server 140 with new capabilities. For example, when a new SaaS virtual machine is added to the SaaS cloud 130, or an existing SaaS virtual machine is configured with new hardware configurations, the agent applications running on the new or existing SaaS virtual machine may be configured to "teach" the management application on how to interact with the new hardware configurations. In addition, when a new software application is deployed to a specific SaaS virtual machine in the SaaS cloud 130, the agent application running on the specific SaaS virtual machines may be configured to "program" the management application on how to operate the new software application. The details of the customizing and programming the management application are further described below.

Figure 2:
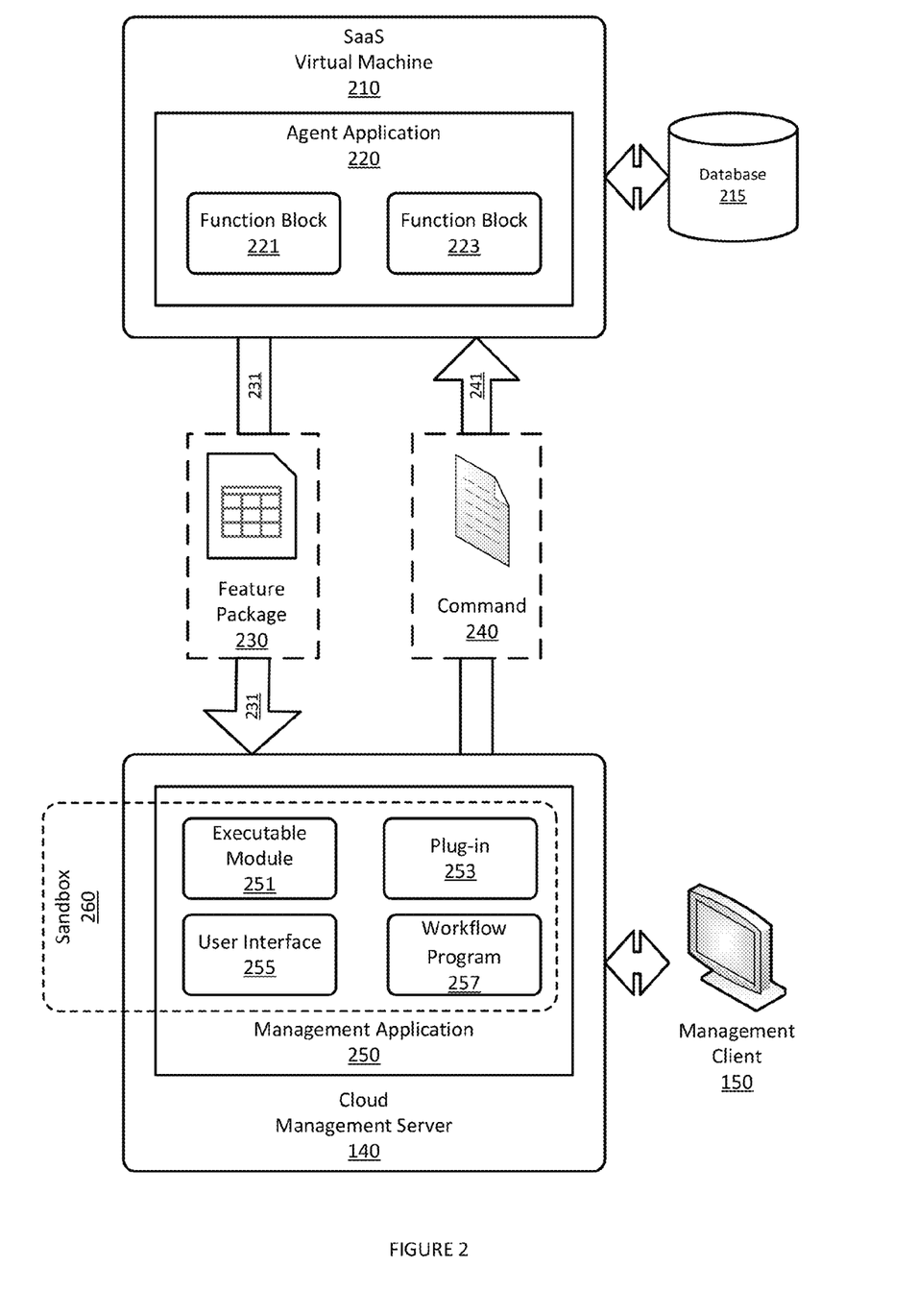
FIG. 2 illustrates a virtual machine configured to customize and program a cloud management server.

FIG. 2 illustrates a virtual machine configured to customize and program a cloud management server, according to some embodiments of the present disclosure. In FIG. 2, a SaaS virtual machine 210, which may correspond to any one of the SaaS virtual machine 121, 123, and 125 of FIG. 1, may be configured to communicate with a cloud management server 140, which may correspond to the cloud management server 140 of FIG. 1. The SaaS virtual machine 210 may be configured to contain, among other modules, an agent application 220 having one or more function blocks (e.g., function blocks 221 and 223). The cloud management server 140 may be configured with, among other modules, a management application 250. A management client 150, which may correspond to the management client 150 of FIG. 1, may communicate with the management application 250 in managing the SaaS virtual machine 210.

In some embodiments, the agent application 220 may be a software module installed and executing in the SaaS virtual machine 210. The agent application 220 may be configured to monitor and manage the SaaS virtual machine 210. Specifically, the agent application 220 may collect the configurations and the statistics of the software and hardware operating in the SaaS virtual machine 210, and control the executions of the software applications that are providing the software services to a SaaS cloud (not shown in FIG. 2). The agent application 220 may be configured to communicate with the management application 250, which may also be a software module installed and executing in the cloud management server 140, via a secure channel such as a Hypertext Transfer Protocol Secure (HTTPS) channel.

In some embodiments, the agent application 220 may be configured to customize and program the management application 250 with new capabilities. For example, a new software application added to the SaaS virtual machine 210 may have a start/stop routine that is different from any of the existing software applications in the SaaS cloud (not shown in FIG. 2). In this case, the agent application 220 may be re-programmed with a function block (e.g., the function block 221) to support the new software application and its start/stop routine. However, the cloud management server 140 as well as its management application 250 may not know, or may not have a mechanism to activate, this start/stop routine of the new software application.

Without making source code changes to the management application 250, the agent application 220 may transmit (231) a feature package 230 to the management application 250, which may program itself using the feature package 230 to support the new software application and its start/stop routine. After being programmed by the feature package 230, the management application 250 may gain additional capabilities, and may be able to invoke the start/stop routine of the new software application by issuing (241) a command 240 to the agent application 220. Upon receiving the command 240, the agent application 220 may invoke the function block associated with the new software application to perform the start/stop routine in the SaaS virtual machine 210. The agent application 220 may further provide a new user interface with native look-and-feel to the management console of the management application 250, thereby allowing the management client 150 to use the same management console for managing the new software application.

More specifically, before installing the feature package 230, the management application 250 may not be aware of some of the configurations and/or the functionalities of the SaaS virtual machine 210. As a result, the management application 250 may neither be able to configure and manage some of these configurations and/or functionalities, nor be able to generate or issue the command 240. After installing the feature package 230, the cloud management server 140 may gain the capabilities to configure and manage the SaaS virtual machine 210. Thus, the feature package 230 may inform the management application 250 the functions and features now supported by the SaaS virtual machine 210, and provide the management application 250 the mechanisms to activate these functions and features, as described below.

In some embodiments, the agent application 220 may initiate a request to upload the feature package 230 to the management application 250. The management application 250 may accept the uploaded the feature package 230, or transmit a message to the agent application 220 to download the feature package 230. Afterward, the management application 250 may program itself by extracting the various modules from the feature package 230, and installing the various modules based on an installation program supplied by the feature package 230. Alternatively, the various modules may be developed based on certain industrial standards (e.g., Enterprise Java Bean standard), and may be loaded into the management application 250 according to these standards.

In some embodiments, the feature package 230 may contain, without limitation, one or more executable modules 251, one or more plug-ins 253, one or more user interfaces 255, and one or more workflow programs 257. The management application 250 may extract these modules and load them into its own operating environment. Optionally, the management application 250 may create a sandbox 260 in the operating system of the cloud management server 140, and execute some of the modules of the feature package 230 in this sandbox 260. The sandbox 260 may be configured to provide a run-time execution environment with restrictions to access certain software and hardware components of the cloud management server 140. In other words, when the management application 250 invokes these modules in the sandbox 260, these modules may have limited accesses to the resources of the cloud management server 140, and therefore may cause little or no effect to the functions of the management application 250 and/or the cloud management server 140.

In some embodiments, the feature package 230 may contain an executable module 251 which may be executed in the cloud management server 140 and/or the management application 250. For example, the executable module 251 may be a JAVA® based application module that can provide a specific type of network communication previously not available in the cloud management server 140. And the cloud management server 140 may provide a Java Virtual Machine ("JVM") sandbox 260 for executing the JAVA based executable module 251. Also, the executable module 251 may be programmed using a domain specific language (DSL) such as shell scripts or SQL. For example, the executable module 251 may contain statistics plotting DSL to plot the charts or tables to be displayed on the management console of the management application 250. Further, the executable module 251 may be a web-based application module that can be executed in a web server environment.

In some embodiments, the executable module 251 may be configured to generate a command 240, transmit the command 240 to the SaaS virtual machine 210, and invoke a specific function block in the agent application 220. Alternatively, the executable module 251 may utilize the management application 250's capabilities for delivering the command 240 to the SaaS virtual machine 210 and/or the agent application 220. For example, the executable module 251 may transmit a command 240 to retrieve the SaaS virtual machine 210's hardware configurations, such as the number of disks in the SaaS virtual machine 210, or the utilization statuses of these disks. Also, the executable module 251 may transfer a command 240 to reconfigure the SaaS virtual machine 210, such as adding or removing disks or network cards. Further, the executable module 251 may issue commands 240 to initiate/format/mount the disks, shutdown/restart the operating, and/or updating the IP wait list, of the SaaS virtual machine 210.

In some embodiments, each of the function blocks 221 and 223 may be an independent process initiated by the agent application 220 and/or executing in the SaaS virtual machine 210. Alternatively, the function blocks 221 and 223 may be threads executing in the agent application 220's application space. Further, the function blocks 221 and 223 may be initiated and/or invoked by the command 240. Afterward, the function blocks 221 and 223 may listen to the external communications (e.g., the command 240) from the cloud management server 140, perform specific operations, and/or transmit messages back to the cloud management server 140 in response to the command 240. In some embodiments, the function blocks 221 may act in a "stateless" mode. In the stateless mode, each command 240 may interact with a newly created process/thread for the function blocks 221 and/or 223. When the function blocks 221 and/or 223 complete their operations, they may terminate without storing any temporary information associated with the command 240. Alternatively, the function blocks 221 and 223 may be concurrently running processes/threads which may operate as daemons for continuously listening to the incoming command 240.

In some embodiments, the feature package 230 may contain a plug-in module 253 guiding the installation of the feature package 230 into the management application 250. For example, the plug-in module 253 may contain XML configuration files for configuring and installing the executable module 251 into an appropriate location in the management application 250. The plug-in module 253 may also contain instructions to update configuration files of the management applications 250, or to load the user interface 255 into the management application 250's management console. The plug-in module 253 may further define runtime parameters for the executing of the workflow program 257. After the executable module 251, the plug-in module 253, the user interface 255, and/or the workflow program 257 are installed in the management application 250, the new features and functionalities in the feature package 230 may become available for use by the management client 150 and/or the management application 250.

In some embodiments, the feature package 230 may contain a user interface 255 that has the similar look-and-feel as the native user interface (e.g., a management console) of the management application 250. The user interface 255 may be designed for users that are familiar with the management console, so that these users may quickly figure out how to operate the new features in the management application 250 without learning a new user interface. The user interface 255 may be constructed using HTML® or JavaScript® codes, and may be installed in a similar approach as the installation of the executable modules 251 in the management application 250. After installation, the user interface 255 may be displayed by the management application 250 in the management console. The user interface 255 may also include configurations to show or hide certain original components in the management console.

In some embodiments, the feature package 230 may contain a workflow program 257, which is configured to assist the management application 250 in performing a workflow (e.g., a database recovery). A "workflow" may describe a process having multiple steps and logics in order to accomplish a specific task. The workflow program 257 may define and organize the multiple steps and logics into executable procedures, taking the user inputs and virtual machine statuses into considerations. The workflow program 257 may be installed into the management application 250 similar to the above installations of the executable module 251 and user interface 255. Afterward, the management application 250 may execute the workflow program 257 to perform the multiple steps defined in the workflow program 257. The details of the workflow program 257 are further described below.

In some embodiments, the SaaS virtual machine 210 may be installed with a database management system (DBMS) application for managing a database 215. The agent application 220 may include a function block 223 which is configured to communicate with the DBMS application and interact with the database 215. Alternatively, the function block 223 may be a module provided by the DBMS application for accessing the database 215.

In one example, the management application 250's database management features may originally support DBMS applications with point-in-time recovery (PITR) and SQL capabilities. However, the database 215 may be a non-SQL database such as MangoDB® that may not support PITR. In this case, the agent application 220 may utilized a feature package 230 to add non-PITR and non-SQL database supports to the management application 250. The feature package 230 may include an executable module 251 which is capable of issuing commands to create/start/stop/restart the non-PITR, non-SQL database. The executable module 251 may also include executable scripts which may be transmitted to the agent application 220 as a part of the command 230, and may be executed against the non-PITR, non-SQL database 215. The feature package 230 may further include a workflow program 257 for executing complex tasks such as backup/restore, or reconfigure the engine of, the non-PITR, non-SQL database 215. The feature package 230 may optionally include a user interface 255 which may be added to the management console of the management application 250, and may switch-off the PITR functions in the management console.

Thus, even after the management application 250 is deployed in the cloud management server 140, a SaaS virtual machine 210 may be able to customize the management application 250 by developing an agent application 220 and utilizing the agent application 220 to customize and program the management application 250. This flexibility may enable the cloud management server 140 and the SaaS virtual machine 210 to evolve on their respective paces, and remove the coupling between the management application 250 and the agent application 220.

Figure 3:
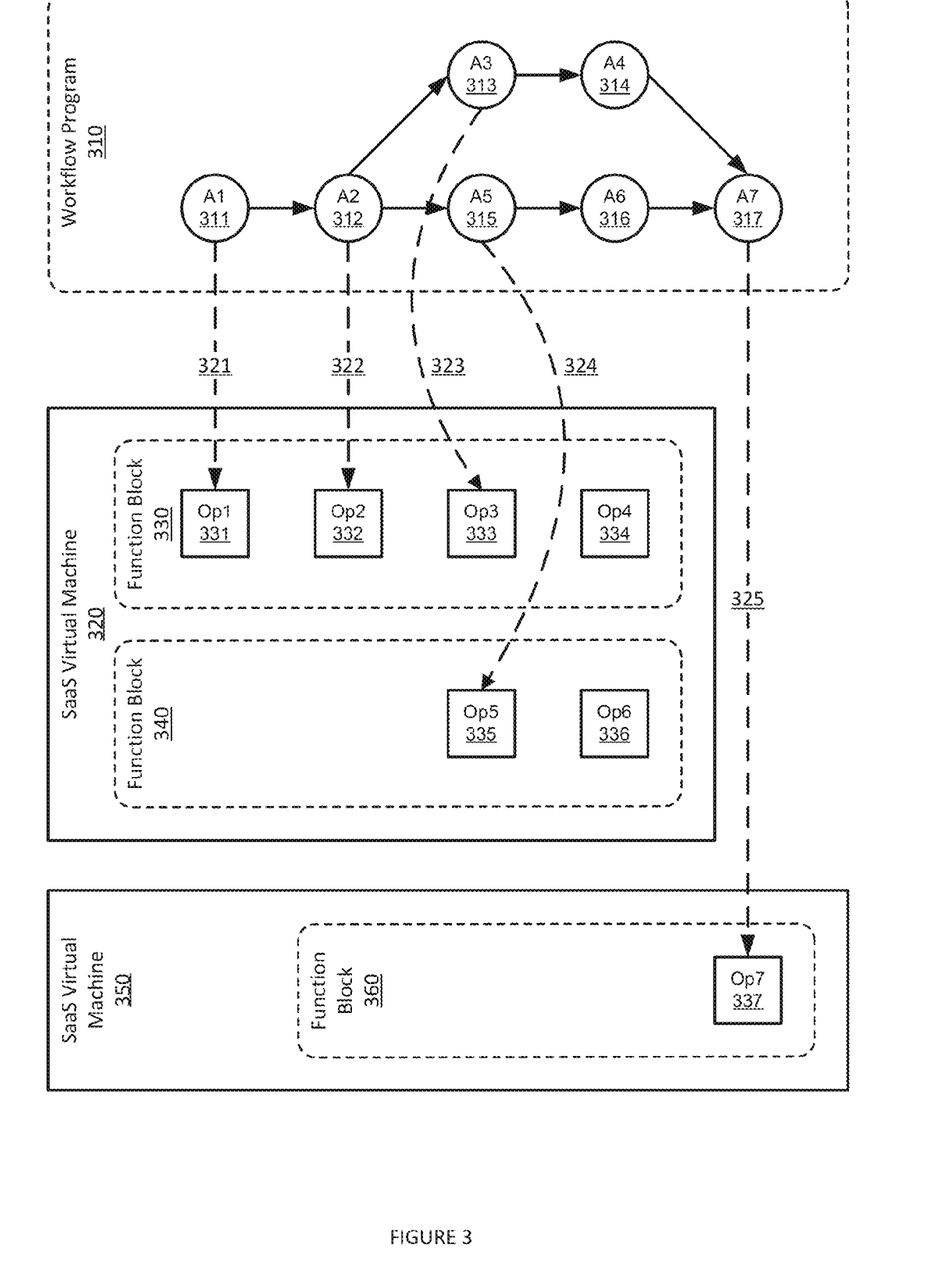
FIG. 3 illustrates a workflow program executable in a management application of a cloud management server.

FIG. 3 illustrates a workflow program executable in a management application of a cloud management server, according to some embodiments of the present disclosure. A SaaS virtual machine 320 may program a cloud management server by transmitting a feature package including a workflow program 310 (similar to the workflow program 257 of FIG. 2) to the cloud management server. A management application of the cloud management server may apply the feature package to itself, and the workflow program 310 may become a part of the management application. The workflow program 310 may contain multiple actions 311, 312, 313, 314, 315, 316, and 317, each of which may be associated with one or more operations 331, 332, 333, 334, 335, 336, and 337. Further, the SaaS virtual machine 320 may be configured with an agent application (not shown in FIG. 3) which contains a function block 330 (with operations 331, 332, 333, and 334) and a function block 340 (with operations 335 and 336). A second SaaS virtual machine 350 may be configured with an agent application (not shown in FIG. 3) having a function block 360 with operation 337.

For example, the workflow program 310 may be a process for upgrading a database in the SaaS virtual machine 320. The workflow program 310 may define a starting action (e.g., action 311) and the logics for invoking the subsequent actions. In other words, once the management application invokes the workflow program 310, the workflow program 310 may start by performing action 311 ("A1"), which issues a command 321 to the SaaS virtual machine 320. Upon receiving the command 321, the agent application of the SaaS virtual machine 320 may perform an operation 331 ("Op1") corresponding to the command 321. In this case the operation Op1 may contain logics to check the running status of the database, and return a database status message in response to the command 321. The workflow program 310 may then evaluate the returned database status message, and upon a determination that the database is operating, select action 312 ("A2") as the next step to perform.

In some embodiments, action A2 may issue a command 322 to the agent application of the SaaS virtual machine 320, which in turn may perform an operation 332 ("Op2"). Operation Op2 may evaluate whether the SaaS virtual machine 320 has sufficient storage space to support the upgrading process, and return a status message to the workflow program 310. The workflow program 310 may evaluate the returned status message, and based on whether there is sufficient storage space, choose either action 313 ("A3") or action 315 ("A5") as the next step of the workflow program 310.

In some embodiments, if the workflow program 310 determines that there is insufficient storage space, then it may perform action 313 to issue a command 323 to activate operation 333 ("Op3") in the function block 330. Operation A3 may perform storage space cleanup and/or add new disks to the SaaS virtual machine 320. If the workflow program 310 determines that there is sufficient storage space, then it may perform action 315 to issue a command 324 to activate operation 335 ("Op5"). The operation Op5 may then download files related to database upgrade from an external source. Further, the operation Op5 may be provided by the function block 340, which is separated from the function block 330. In some embodiments, the function blocks 330 and 340 may be processes/threads concurrently executing on the SaaS virtual machine 320. Alternatively, the command 324 may include mechanism to initiate a new process/thread associated with the function block 340, and communicate with the newly initiated process/thread in performing the operation Op5. Thus, the workflow program 310 allows the agent application to perform dynamic operations on the SaaS virtual machine 320.

In some embodiments, the workflow program 310 may define a set of actions which may interact with one or more function blocks located in one or more SaaS virtual machines 320 and 350. For example, in the workflow program 310, the action 317 ("A7"), which is to execute a second workflow program (not shown in FIG. 3), may invoke an operation 337 ("Op7") located in the function block 360 of a separate SaaS virtual machine 350. The operation Op7 may be configured to transmit a second feature package containing the second workflow program to the cloud management server. The cloud management server may then install the second feature package in the management application of the cloud management server, so that the workflow program 310 may activate the actions in the second workflow program. Thus, the workflow program 310 allows the agent application to orchestrate complex operations, and make intelligent determinations based on a specific operating status of the virtual machine.

Figure 4:
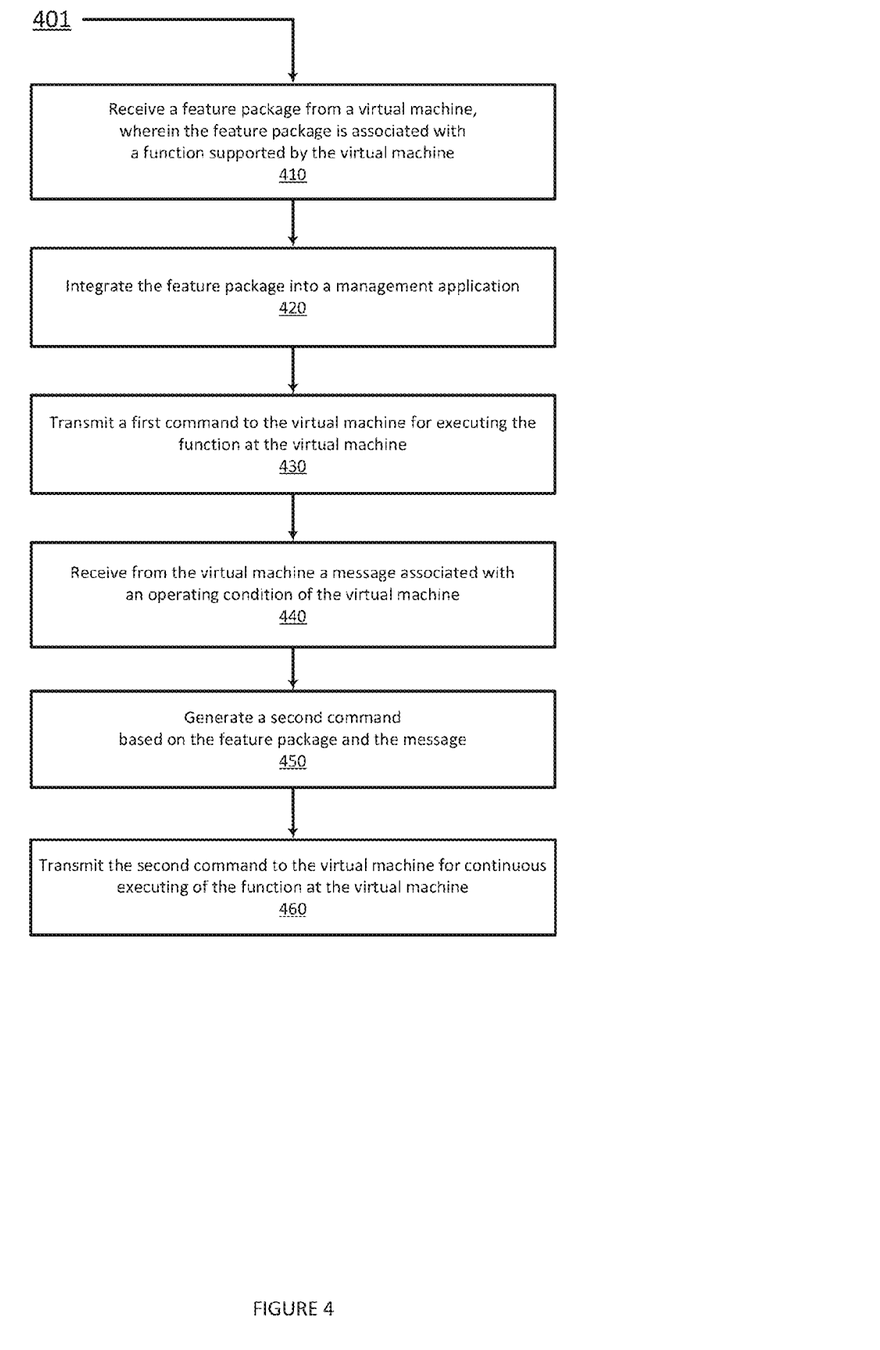
FIG. 4 shows a flow diagram illustrating one example process for managing SaaS provided by a virtual machine.

FIG. 4 shows a flow diagram illustrating one example process 401 for managing SaaS provided by a virtual machine, according to some embodiments of the present disclosure. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

At block 410, a management system (e.g., a cloud management server) may receive a feature package from a virtual machine (e.g., a SaaS virtual machine). The virtual machine may be located in a SaaS cloud to provide cloud-based software services. The virtual machine may be configured with an agent application, and the management system may be configured with a management application. In some embodiments, the management application may lack certain capabilities to monitor or control the virtual machine as well as the software services provided by the virtual machine. The feature package may be associated with a function supported by the virtual machine but is not yet accessible and manageable by the management system.

At block 420, the management application of the management system may integrate the feature package into the management application. In some embodiments, the management application may extract an executable module from the feature package, install the executable module in the management application, and launch the executable module in a sandbox for the management system. Further, the executable module may be configured to issue a first command to the virtual machine and/or the agent application for invoking the function at the virtual machine. Thus, the feature package may allow the management system to gain the management capabilities it previously does not have before integrating the feature package, and the first command may be generated based on the feature package.

In some embodiments, the management application may extract a user interface from the feature package. The user interface may be configured to provide an interface for the executable module. The integration process may include installing the user interface as a component of the management application. During operation, the management application may display the user interface in a management console of the management application. A user of the management console may transmit a user instruction to the management application via the user interface. Based on the user instruction, the management application may activate the executable module to issue the first command to the virtual machine. In other words, the first command may be generated by the management application based on the feature package.

At block 430, the management application and/or the executable module may transmit the first command to the agent application executing on the virtual machine. In some embodiments, the agent application may invoke the function in the virtual machine, and generate a message associated with the executing of the function in the virtual machine. The message may be related to an operating condition of the virtual machine, or a status of the execution of the function.

At block 440, the management application may receive from the virtual machine the message associated with the operating condition of the virtual machine. At block 450, the management application may generate a second command generated based on the feature package and the message. In some embodiments, the first command and the second command may be defined in a workflow program, which may be extracted from the feature package and installed in the management application. The management application may perform the workflow program, which contains logics to determine and generate the second command based on the message received from the virtual machine after issuing the first command.

At block 460, the management application and/or the workflow program may transmit the second command to the virtual machine for continuous executing of the function at the virtual machine. In some embodiment, the function may be a function block containing multiple operations. The agent application may perform a first operation in the function block upon receiving the first command, and perform a second operation in the function block upon receiving the second command. In other words, the first command may allow the executing of some operations in the function block, and the second command may allow the continuous executing of other operations in the function block.

Figure 5:
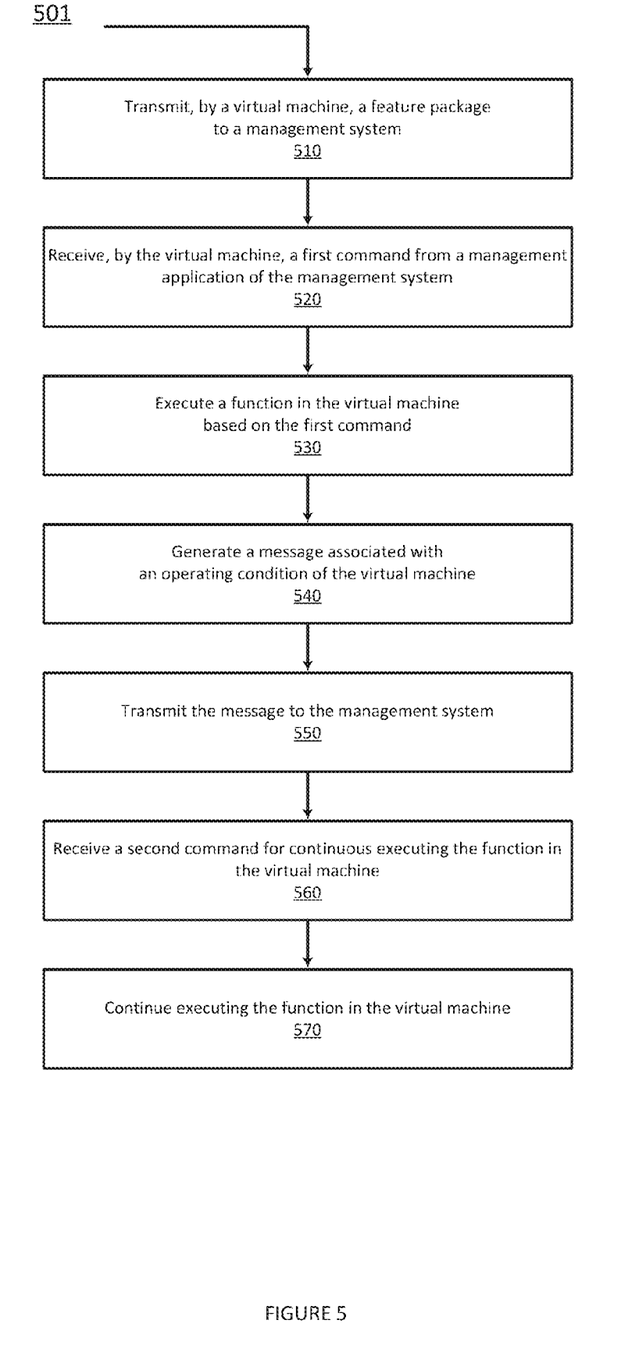
FIG. 5 shows a flow diagram illustrating one example process for customizing and programming a management application of a cloud management server, all arranged in accordance to some embodiments of the present disclosure.

FIG. 5 shows a flow diagram illustrating one example process 501 for customizing and programming a management application of a cloud management server, according to some embodiments of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, an agent application executing on a virtual machine may transmit a feature package to a management system. The virtual machine may be located in a SaaS cloud to provide cloud-based software services, and the management system may be a cloud management server configured with a management application. In some embodiments, the management application may lack certain capabilities to monitor or control the virtual machine as well as the software services provided by the virtual machine. The feature package may enable the management application to issue a first command for executing a function at the virtual machine.

In some embodiments, the feature package may include an executable module for the management application. The executable module may be configured to issue at the management system the first command, and transmit the first command to the virtual machine. The feature package may also include a user interface configured to provide an interface for the executable module. The management application of the management system may be configured to install the user interface as a component of the management application. The feature package may further include a workflow program defining the first command and a second command. In this case, the management application may be configured to perform the workflow program and generate the first command and the second command.

At block 520, the agent application may receive from the management application the first command for executing the function. At block 530, the agent application may execute the function in the virtual machine based on the first command. At block 540, the agent application may generate a message associated with an operating condition of the virtual machine. At block 550, the agent application may transmit the message to the management application after executing the function.

At block 560, the agent application may receive from the management application a second command for continuous execution of the function at the virtual machine. In some embodiments, the second command, which is issued by a workflow program invoked by the management application, may be generated based on the first command and the message transmitted to the management system.

At block 570, the agent application may continue the execution of the function at the virtual machine based on the second command. In other words, the agent application may follow the direction of the workflow program to perform a specific task.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Systems and methods for customizing and programming a cloud-based management server have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more non-transitory computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured to manage Software-as-a-Service (SaaS) provided by a cloud of one or more virtual machines, the system comprising a processor and a memory coupled with the processor, wherein the memory is configured to provide the processor with instructions for:
    in response to supporting a new function of a software application by the cloud, receiving, by a management system having a management application, a feature package from an agent application executing in a virtual machine in the cloud, wherein the agent program is re-programmed with the new function, the feature package is associated with the new function, and the one or more virtual machines are created based on a virtual machine template;
    integrating, by the management system, the feature package into the management application;
    extracting, by the management system, an executable module from the feature package in a run-time execution environment within the management system and with restrictive access to resources of the management system;
    invoking execution of the executable module, by the management system, to generate a first command; and
    transmitting, by the management system, the first command to the virtual machine to invoke execution of a first operation of the agent application, wherein the first operation is associated with the new function.

2. The system of claim 1, wherein the memory is further configured to provide the processor with instructions for:
    receiving, by the management system from the virtual machine, a message associated with an operating condition of the virtual machine;
    generating, by the management system, a second command based on the feature package and the message; and
    transmitting, by the management system, the second command to the virtual machine to invoke execution of a second operation of the agent application, wherein the second operation is associated with the new function.

3. The system of claim 1, wherein the integrating the feature package further comprises:

extracting an user interface from the feature package, wherein the user interface is configured to provide an interface for the executable module; and installing the user interface as a component of the management application.

4. The system of claim 3, wherein the memory is further configured to provide the processor with instructions for:

displaying, by the management application, the user interface; and receiving an instruction via the user interface for issuing the first command.

5. The system of claim 2, wherein the first operation and the second operation are associated with a thread configured to run in the agent application.

6. The system of claim 2, wherein the first operation and the second operation are associated with a first thread and a second thread, respectively, and the first thread and the second thread are configured to run concurrently in the agent application.

7. A non-transitory machine readable storage medium embodying computer software, the computer software causing a management system having a management application to perform a method to manage Software-as-a-Service provided by a cloud of one or more virtual machines, the method comprising in response to supporting a new function of a software application by the cloud, receiving, by the management system, a feature package from an agent application executing in a virtual machine in the cloud, wherein the agent program is re-programmed with the new function, the feature package is associated with the new function, and the one or more virtual machines are created based on a virtual machine template;

integrating, by the management system, the feature package into the management application;

extracting, by the management system, an executable module from the feature package in a run-time execution environment within the management system and with restrictive access to resources of the management system;

invoking execution of the executable module, by the management system, to generate a first command; and transmitting, by the management system, the first command to the virtual machine to invoke execution of a first operation of the agent application, wherein the first operation is associated with the new function.

8. The non-transitory machine readable storage medium as recited in claim 7, wherein the method further comprising:

receiving, by the management system from the virtual machine, a message associated with an operating condition of the virtual machine;

generating, by the management system, a second command based on the feature package and the message; and transmitting, by the management system, the second command to the virtual machine to invoke execution of a second operation of the agent application, wherein the second operation is associated with the new function.

9. The non-transitory machine readable storage medium as recited in claim 7, wherein the integrating the feature package further comprises:

extracting an user interface from the feature package, wherein the user interface is configured to provide an interface for the executable module; and installing the user interface as a component of the management application.

10. The non-transitory machine readable storage medium as recited in claim 8, wherein the integrating the feature package further comprises:

extracting a workflow from the feature package, wherein the workflow defines the first command and the second command, and the management system is configured to process the workflow and generate the first command.

11. The non-transitory machine readable storage medium as recited in claim 10, wherein the management system is further configured to process the workflow and generate the second command based on the message received from the virtual machine.

* * * * *